Jan. 9, 1962     H. R. DENTON     3,015,916
MEANS AND METHOD FOR BANDING OBJECTS
Filed June 2, 1959     5 Sheets-Sheet 1
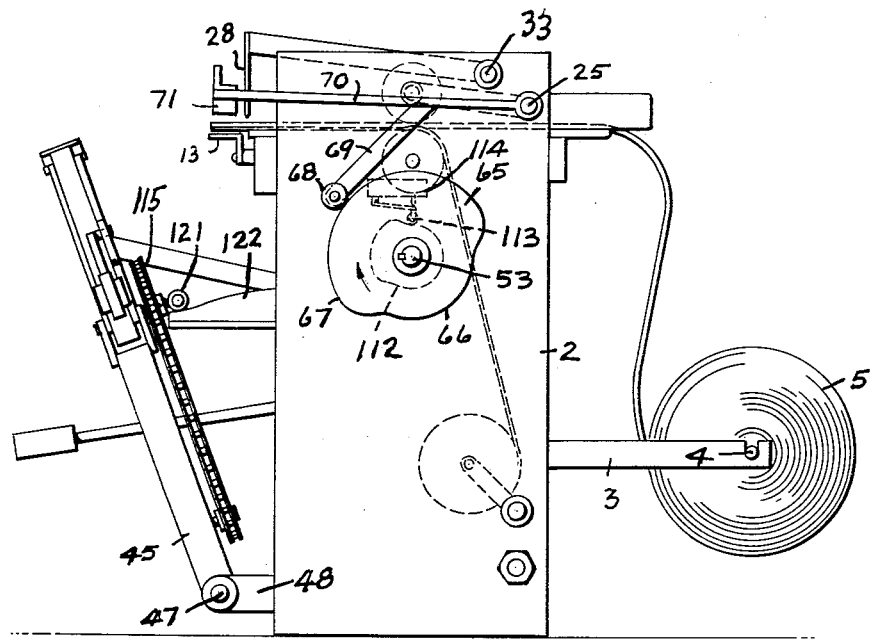
FIG_1
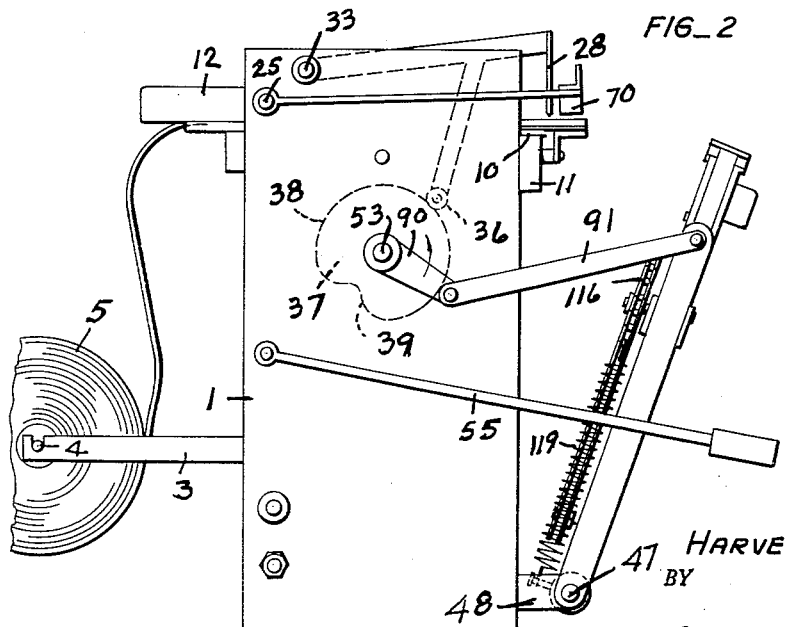
FIG_2
INVENTOR.
HARVEY R. DENTON
BY
Boyken, Mohler & Wood
ATTORNEYS

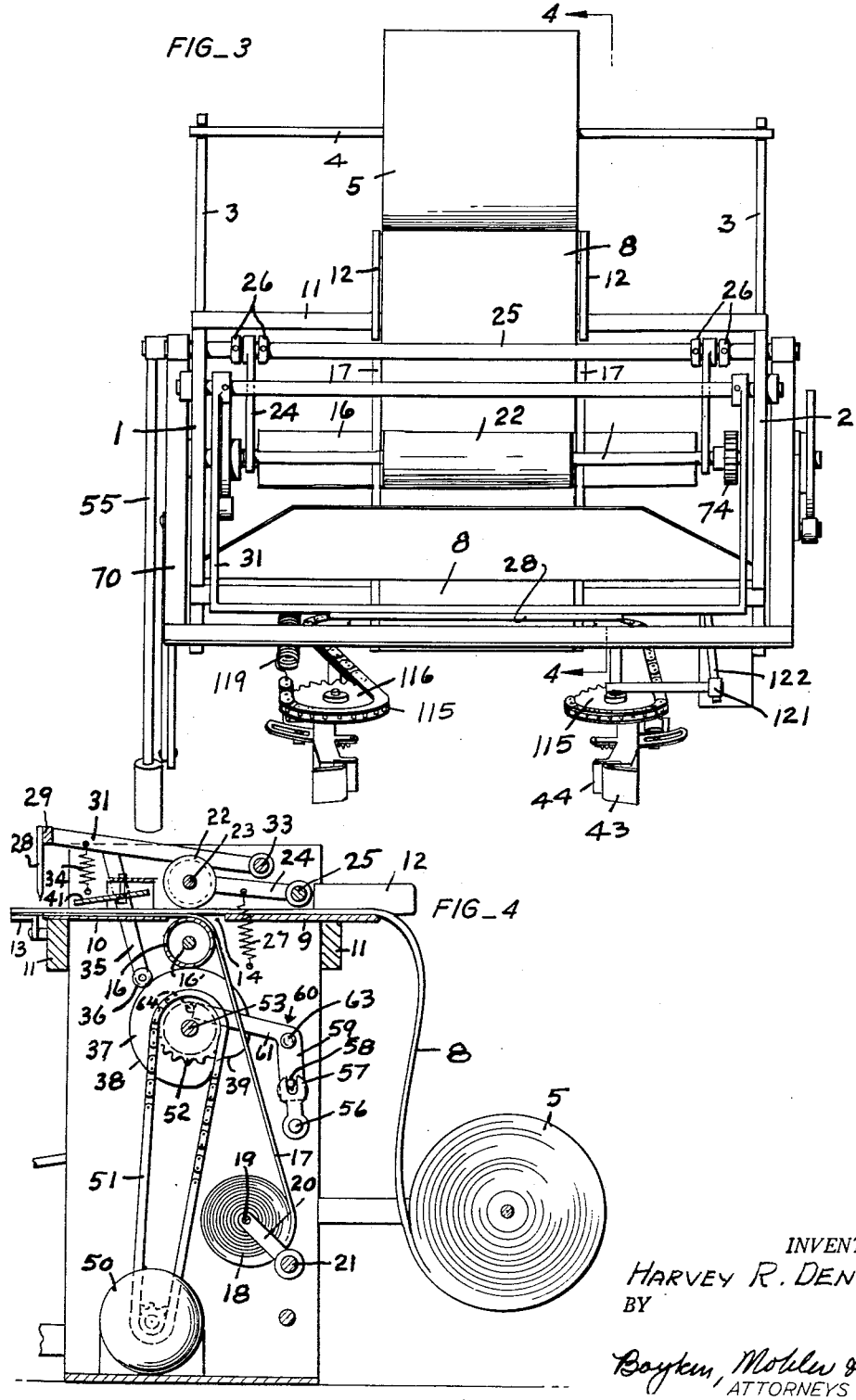

Jan. 9, 1962　　　H. R. DENTON　　　3,015,916
MEANS AND METHOD FOR BANDING OBJECTS
Filed June 2, 1959　　　　　　　　　　　5 Sheets-Sheet 3
FIG_5
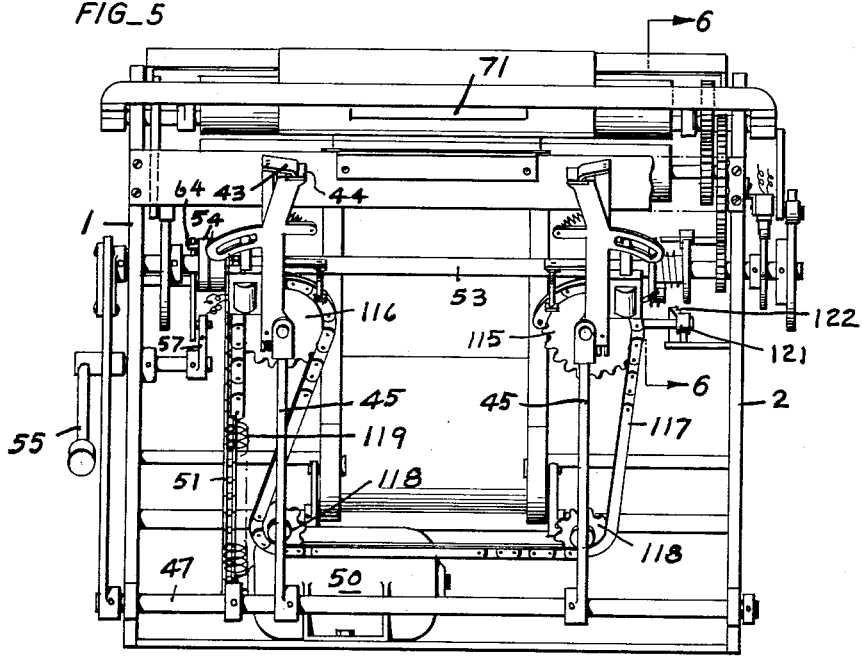
FIG_6
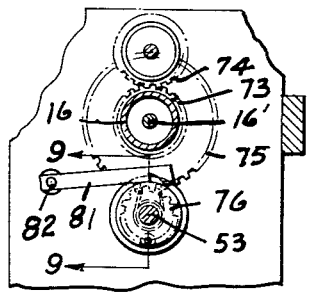
FIG_7
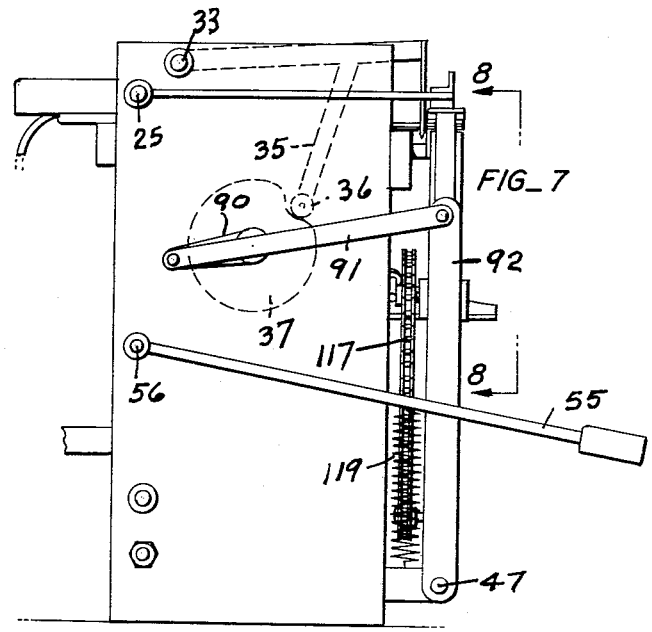
INVENTOR.
HARVEY R. DENTON
BY
Boykin, Mohler & Wood
ATTORNEYS Jan. 9, 1962 H. R. DENTON 3,015,916
MEANS AND METHOD FOR BANDING OBJECTS
Filed June 2, 1959 5 Sheets-Sheet 4
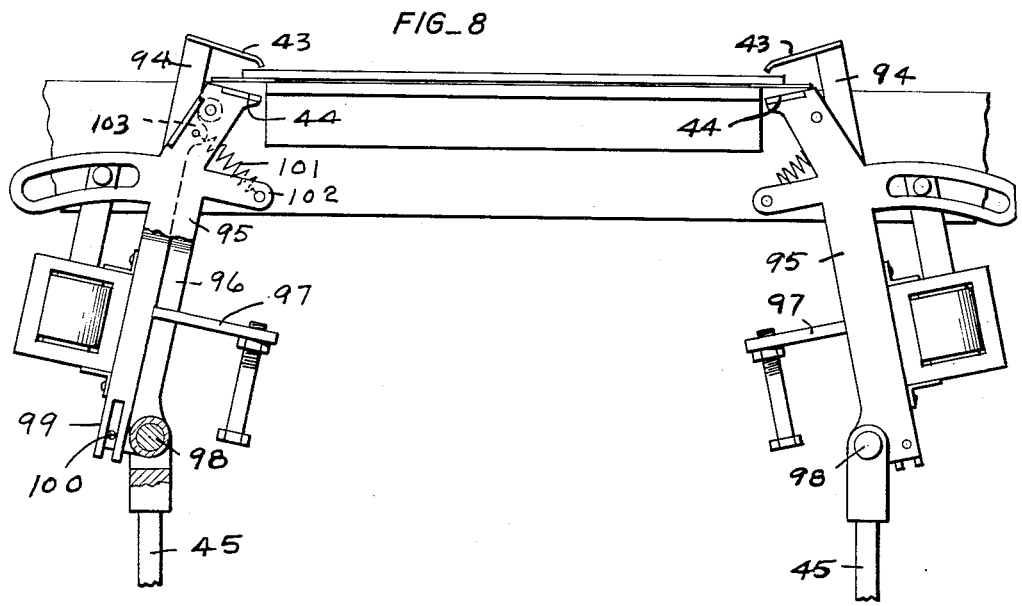
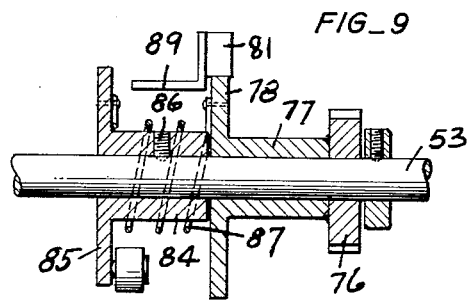
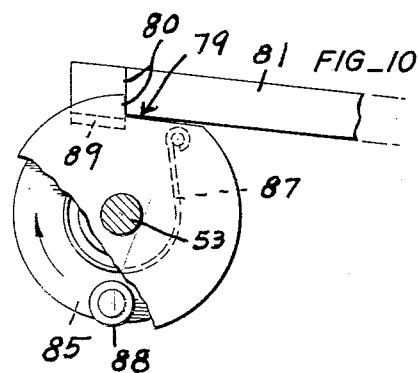
INVENTOR.
HARVEY R. DENTON
BY
ATTORNEYS Jan. 9, 1962 H. R. DENTON 3,015,916
MEANS AND METHOD FOR BANDING OBJECTS
Filed June 2, 1959 5 Sheets-Sheet 5
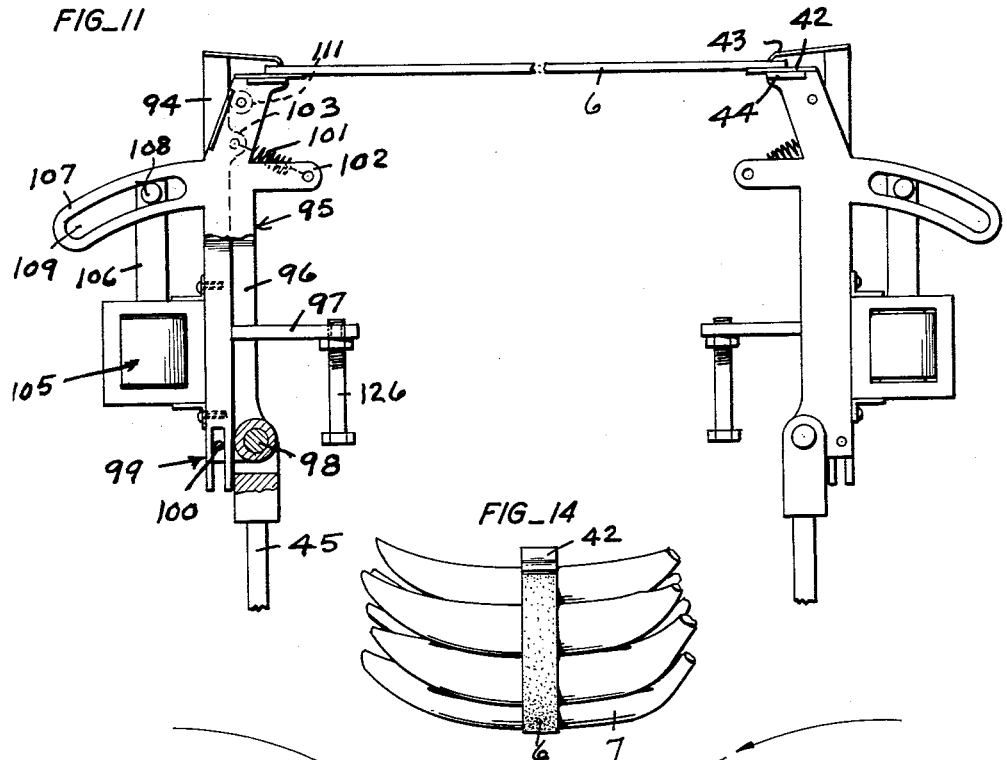
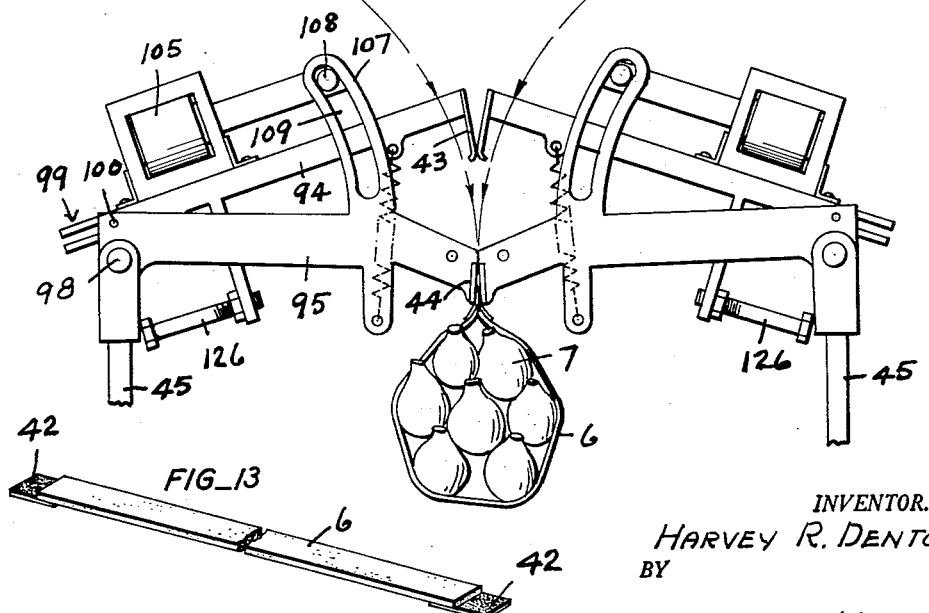
INVENTOR.
HARVEY R. DENTON
BY
Boykin, Mohler & Wood
ATTORNEYS

United States Patent Office 3,015,916
Patented Jan. 9, 1962

3,015,916
MEANS AND METHOD FOR BANDING OBJECTS
Harvey R. Denton, 4266 Edge Drive, Oakland, Calif.
Filed June 2, 1959, Ser. No. 817,547
7 Claims. (Cl. 53—3)

This invention relates to a machine for use in banding a group of objects or produce together.

The practice of securing a group of objects, such as bananas, apparagus, and other elongated objects together as a unitary package for sale, display and handling as a unit, has been found to be particularly desirable. The objects can be examined from most of their sides, and they are not as readily injured as when handled individually, and furthermore, they are easily and safely carried and make a good display. However, the lack of uniformity in such objects, and their susceptibility to bruising, presents problems in their packaging that are not encountered in the packaging methods and means that are concerned with the packaging of uniform sized and shaped objects that may be handled relatively roughly without causing injury thereto.

One of the objects of this invention is the provision of a machine that is adapted to be employed in the banding together of a plurality of elongated objects, such, for instance, as loose bananas, at a relatively high rate of speed and without injury to the objects so banded.

Another object of the invention is the provision of a machine that is adapted to cut elastic strips from a band of elastic mtaerial and to present each strip in a stretched condition for wrapping about a plurality of elongated objects that are in a group, and to secure the ends of each strip together after the band or strip encircles the group of objects, upon the objects being moved against the stretched strip to effect the encirclement of the objects by the strip.

A further object of the invention is the provision of means and a method for adherently securing the ends of a strip of elastic, rubber-like material around a group of elongated objects to form a package, without requiring a glue or adhesive applying device, and without requiring staples or the like.

Another object of the invention is the provision of a package of bananas, or other elongated objects that includes a strip of resilient, stretchable material extending around the group of bananas and which strip includes means for securing its ends together in a manner to provide a projecting tab that is adapted to have tags or other material secured thereto without weakening the strip.

Another object of the invention is the provision of an improved method for forming a unitary package from a group of dissimilar sized elongated fruit or vegetables in an economical manner that does not injure the fruit and which package enables examining the fruit from all sides of the package.

Other objects and advantages will appear in the description and drawings.

In the drawings:

FIG. 1 is a side elevational view of a machine adapted for use in forming a unitary package of elongated objects as seen from one side of the device.

FIG. 2 is a side elevational view of the machine of FIG. 1 as seen from the side opposite to the side shown in FIG. 1 a portion of the roll of elastic material shown in FIG. 1 being omitted to accommodate the view to the sheet.

FIG. 3 is a top plan view of the machine of FIG. 1.

FIG. 4 is a vertical sectional view taken along line 4—4 of FIG. 3.

FIG. 5 is a front elevational view of the machine of FIG. 1.

FIG. 6 is an enlarged fragmentary sectional view taken along line 6—6 of FIG. 5.

FIG. 7 is a view similar to that of FIG. 2 but omitting the roll of material shown in FIG. 2 and showing the parts of the machine in a stage in its operation that is different from that of FIG. 2.

FIG. 8 is an enlarged front elevational view of part of the machine as seen from line 8—8 of FIG. 7 but omitting some of the elements of FIG. 7 for clarity.

FIG. 9 is an enlarged fragmentary sectional view of the feed roller driving mechanism.

FIG. 10 is a view of the portion shown in FIG. 9 as seen from the left end thereof.

FIG. 11 is a view similar to that of FIG. 8 showing the parts in a different stage of a banding operation than the stage shown in FIG. 8.

FIG. 12 is an enlarged fragmentary elevational view of elements shown in FIGS. 8 and 11 that complete the banding step.

FIG. 13 is an isometric view of a banding strip after cut from a band and ready for a banding operation.

FIG. 14 shows a bundle of bananas banded together.

In detail, the machine herein illustrated as an example of the invention, comprises an upstanding frame having spaced, opposed, vertically extending side frame members 1, 2 (FIG. 5). Said members carry supporting brackets 3 projecting rearwardly therefrom, and which brackets, in turn, carry a roll 5 of soft, elastic, rubber-like plastic material, such as a poly urethane, that is of cellular formation substantially as shown and described in my copending application Serial No. 667,581, filed June 4, 1957, now U.S. Patent No. 2,882,660. Such material is odorless, non-toxic, and resistant to attack from fruit and vegetable acids and to deterioration from moisture, and is relatively strong.

The material of roll 5 is in the form of a relatively wide band adapted to be cut transversely thereof into strips 6 (FIG. 13). Such strips may be stretched longitudinally thereof to a substantial degree without danger of breakage, and when so stretched and brought around a group of bananas 7 (FIG. 14) for securing the opposite ends together said strip will yieldably hold the bananas tightly together as a unit or package, without cutting or bruising the fruit, and the same is true of other produce that may be held together by the strips in a similar manner.

The band 8 from roll 5 (FIG. 1) is adapted to extend forwardly from said roll over spaced, coplanar plates 9, 10 (FIG. 4) that are supported on suitable cross pieces 11 carried by the side frame members. Parallel guide strips 12 (FIG. 3) extend to and over plate 9 for guiding the band 8 across said plates and across the upper surface of a horizontal strip 13 (FIG. 1) that is along the forward side of the machine. The upper surfaces of strip 13 and plates 9, 10 are substantially horizontal and coplanar.

The words "forward," "forwardly," "rear" and "rearwardly" and words of similar import, are used with respect to the direction of movement of the band 8, which moves "forwardly" from roll 5 and across strip 13, which strip is at the "forward" side of the machine, while roll 5 is at the rear side thereof.

There is a gap 14 between plates 10, 11 (FIG. 4), over or across which gap the band 8 passes. The upper portion of a lower roller 16 extends into said gap 14, and a pair of parallel adhesive tapes pass through said gap and over roller 16. A shaft 16' rotatably supported by side frame members 1, 2 carries the roller 16.

Tapes 17 extend from a pair of rolls 18 thereof, which rolls are respectively mounted for rotation on stub shafts 19 that, in turn, are supported on bracket arms 20. Said bracket arms are carried on a rod 21 that extends between, and is carried by, the frame members 1, 2 (FIGS. 4, 5).

The rolls 18 are so positioned that the tapes 17 drawn therefrom extend parallel with the side edges of the band 8 and on plate 10 in positions partially below the marginal portions of said band along said edges. The ever-tacky gummed side of the tapes face upwardly so that said tapes will be adhered to said marginal portions with a substantial portion of the widths of said tapes projecting outwardly of said band and with the upper gummed sides of the projecting portions exposed.

An upper roller 22 is supported over roller 16. Said roller 22 is carried on a shaft 23, which shaft is rotatably supported at its ends on one of the ends of a pair of generally horizontally extending arms 24 (FIG. 4). The other ends of arms 24 are rotatably supported on a horizontal shaft 25 and between collars 26 that are secured on said shaft (FIG. 3). Shaft 25, in turn, is carried by, and extends between frame members 1, 2. A spring 27 (FIG. 4) connects each arm 24 with a pin therebelow, and each such pin is secured on frame members 1, 2 respectively. Thus the springs 27 yieldably hold the roller 22 downwardly against band 8, and press the band against the adhesive covered upper sides of tapes 17. The length of roller 22 is such that it terminates at its ends substantially at the side edges of band 8 (FIG. 3) so as not to be likely to touch the gummed upper sides of the tapes 17 where they extend outwardly of said edges.

The drive for the band 8 and the tapes 17 will later be described more in detail, but at this point it should be noted that the drive is such that the band 8 with the tapes 17 are driven forwardly by and past the rollers 16, 22 between which they extend.

The strip 13 that is along the forward edge of the plate 10 actually is an angle iron strip in which one leg is vertically disposed and is secured to the cross member 11 of the frame, and the other leg is the portion that is horizontal and that is substantially coplanar with the upper surface of plate 10.

The strip 13 is spaced from the forward edge of plate 10, and plate 10 at its forward edge may constitute a stationary shear plate for a cutting blade 28 (FIG. 4).

The blade 28 has a substantially horizontally extending lower cutting edge that is adapted to extend across the band 8 and tapes 17 that, in turn, extend therebelow across the space between strip 13 and plate 10. This blade is secured to a cross bar 29, that, in turn, is connected at its ends with a pair of parallel arms 31. Arms 31 extend rearwardly and generally horizontally relative to blade 28, and are secured at their rear ends to a rotary shaft 33 that is carried at its ends by frame members 1, 2. A helical spring 34 connects at least one of said arms 31 with a pin therebelow that is on frame member 1 for yieldably urging the arms and cutter blade downwardly.

Arm 31 with which spring 34 is connected has a downward extension 35 (FIGS. 2, 4) rigid therewith, and which extension carries a cam follower 36 that, in turn, rides on the peripheral cam surface of a cam 37.

From the above arrangement, it will be seen that spring 34 yieldably holds the cam follower 36 against cam 37 so that the arms 31 and cutter blade 28 will move up and down according to the outer peripheral contour of cam 37. In other words, a high portion 38 on cam 37 will hold blade 28 upward above the band 3 and tapes 17 but upon cam 37 being rotated to where the cam surface falls, as at 39 (FIG. 2) the blade will quickly be lowered to cut the band 8 and tapes 17 and will quickly rise again as the riser portion on the cam reaches the cam follower.

In passing over plate 10 to the blade 28, the band 8 and tapes 17 will pass below a relatively loosely supported guide plate 41 (FIG. 4) that is loosely carried by plate 10 spaced thereabove and above tapes 17, and which plate 41 may substantially ride on the band 8 to urge it down by gravity upon the latter tending to buckle upwardly during a cutting operation.

Each strip 6 after being cut from the band 8 will project beyond the ends of the supporting strip 13 as seen in FIG. 8, and also, after each strip 6 is formed, a pair of open gripping jaws 43, 44 (FIG. 8) will move to positions above and below the said opposite ends of said strip for gripping the ends of said strip therebetween upon movement of the jaws 43, 44 toward each other but the upper jaw 43 of each pair thereof will not engage the gummed upper surfaces of the tape sections or tabs 42.

The gripping jaws are carried on a pair of arms 45 (FIGS. 5, 8) that extend upwardly from, and that are secured on, a horizontal shaft 47 (FIGS. 1, 2). Shaft 47 is carried at its ends on brackets 48 (FIG. 1) carried by frame members 1, 2 adjacent to the forward lower edges thereof.

Going back to the driving means for the machine, a motor 50 (FIGS. 4, 5) is connected by a sprocket chain 51 with a sprocket wheel 52 secured on a sleeve that is continuously rotatable on a shaft 53 (FIGS. 4, 5, 6) and secured on shaft 53 adjacent to the wheel 52 is a conventional single rotation clutch 54 (FIGS. 4, 5) in which downward swinging of a trip lever 55 (FIGS. 5, 7) will effect rotation of a shaft 56 to which the lever is secured. This shaft is rotatably supported on frame member 1, and carries a fork 57 (FIG. 4) at the end thereof, and which fork is between the frames 1, 2 but adjacent to the former (FIG. 5). A pin 58 (FIG. 4) on one end of one arm 59 of a bell crank 60 extends between the sides of the fork 57. The other arm 61 of the crank 60 extends alongside clutch 54. Crank 60 is pivotally supported on a horizontal pivot 63 at the junctures between arms 59, 61.

Clutch 54, as already indicated, is a conventional, single revolution clutch of the type in which clutch rollers are moved into driving contact by a spring (not shown) when a revolution of a stop pin 64 (FIGS. 4, 5) is permitted. When the revolution of the stop pin is interrupted by the end of arm 61 and the pin is held against movement about the axis of shaft 53, the shaft 53 and the sprocket wheel 52 are disconnected, but when pin 64 is released, the shaft 53 and sprocket wheel 52 will be connected so that rotation of sprocket wheel 52 will cause corresponding rotation of shaft 53.

It will be seen that by lifting the trip lever 55 the bell crank 60 will be rotated to move the outer end of arm 61 out of the path of pin 64 and the clutch will connect the sprocket wheel 52 and shaft 53 for driving the latter, and upon then releasing the trip lever, the arm 61 will automatically fall against shaft 53 and into the path of pin 64 to stop rotation of the shaft after one revolution thereof.

Secured on shaft 53, in addition to cam 38, is a cam 65 (FIG. 1) that has a low side 66 and a high side 67. A cam follower 68 carried on the lower end of an arm 69 rides on this cam 65. Arm 69 is secured at its upper end to one of a pair of parallel arms 70 that extend generally horizontally forwardly from the ends of shaft 25 on which said arms are adapted to pivot. The forward ends of arms 70 carry a member 71 that may be termed a "hold-down" (FIGS. 1, 5) since it functions to hold down the band 8 at a point forwardly of the cutting blade during a cutting operation, and to hold the strip 6 on the angle strip 13 until the grippers 43, 45 grip the ends of the strip that project beyond ends of the supporting strip 13.

When the follower 68 is at the low side of the cam 67 the hold-down is in lowered holding position (FIG. 7), and when the high side of the cam is at the follower, the hold-down is elevated as seen in FIG. 1. The hold-down and arms 70 have been omitted from FIG. 4 for clarity in showing other structure.

FIGS. 5 and 6 show that the shafts 16' and 23 respectively carrying the drive rollers 16, 22 are provided with spur gears 73, 74 having intermeshing teeth so that they will be driven together when the upper roller is drawn against the band 8, and a large gear 75 is also secured on the shaft 16' that carries the lower roller 16.

A pinion gear 76 is rotatably mounted on shaft 53 (FIGS. 5, 6, 9, 10) and this gear has its teeth in mesh with the teeth of the gear 75.

Secured to the pinion 76 is the hub 77 (FIG. 9) of an annular disc 78 that is formed with a notch 79 (FIG. 10) in its periphery. The normal rotation of shaft 53 being clockwise as seen in FIG. 10 the circumferentially facing shoulder 80 of notch 79 will face the direction of rotation of the disc 78.

Riding on the edge of disc 78 is the forward end of a bar 81 (FIGS. 6, 10) which bar is pivotally connected with side frame member 2 at its rear end as at 82 (FIG. 6). The forward square end of the bar 81 is adapted to drop into notch 79 (FIG. 10) to hold the disc, and consequently gear 76 against rotation, but when the said forward end is lifted out of the notch, the disc can make one revolution, when the bar will again automatically drop into the notch to stop the pinion 76, and consequently the driving of the rollers 16, 23.

Secured on shaft 53 adjacent to the disc 78 is the hub 84 of a second disc 85. A set screw 86 may secure hub 84 to shaft 52. A helical spring 87 is around hub 84 and said spring is connected at one end thereof with the disc 78 while the opposite end is connected with the disc 85. This provides a yieldable driving connection between the spur gear 76 and shaft 53.

Also carried on disc 85 is a roller 88. Bar 81 has an angle piece 89 secured to its forward end, which angle strip is adapted to be engaged by roller 88 to lift the bar 81 out of notch 78, thereby permitting the disc 85 to drive the gear 76 through spring 87. The reason for this is that the shaft 53 must be operating to effect movement of the knife 28, hence the gear 76 would be moving to feed the band 8 during cutting of the band by the knife unless rotation of gear 76 were to be stopped while the knife 28 cut the band. Bar 81 stops gear 76 during cutting of the band, but spring 87 permits the shaft 52 to continue rotation during this cutting step. As soon as the cutting step is accomplished, the roller 87 releases the gear 76 which will then be driven by spring 87 slightly faster than shaft 53 until the accumulated tension on the spring during stoppage of the gear 76 has been exhausted, when the band 8 and tape 17 will again be driven normally during the remainder of the cycle. This arrangement is important since it accomplishes in a very simple, efficient, and trouble-free manner a result that otherwise would require a complicated structure that would be more costly, less efficient, and susceptible to trouble.

Connected with drive shaft 53 is a crank arm 90 (FIG. 7), which arm is connected by a link 91 with the upper end of an upstanding arm 92. Arm 92 is connected at its lower end with shaft 47 to which the lower ends of the pair of arms 45 are attached.

As has previously been mentioned, the shaft 47 also has arms 45 secured thereto, and arms 45, in turn, carry the gripping jaws 43, 44. Thus the rotation of the shaft 53 will actuate crank arm 90 and link 91 and arm 92 to swing the upper ends of arms 45, and consequently the jaws 43, 44 toward and away from the strip 6 that is cut by knife 28 from the band 8, it being understood that the adhesive tape sections 42 are on the ends of the strip 6.

The upper jaws 43 are carried on the upper ends of vertically elongated members 94 (FIGS. 8, 11), which jaws extend toward each other.

Alongside members 94 are similarly elongated arms 95. These members 95 are at the adjacent sides of the pair of members 94, and said arms are recessed along the sides thereof that are against the members 94 to receive said members, there being a vertically extending slot 96 (FIG. 8) in each arm 95 through which a horizontally extending projection 97 extends from each member 94.

The lower ends of the arms 95 are each secured on a shaft 98 carried by the upper end of each arm 45 for swinging of the upper ends of arms 95 and members 94 toward and away from each other.

The lower end of each member 94 is formed with a downwardly opening fork 99 between the sides of which projects the ends of a pin 100 carried by each arm 95 (FIGS. 8, 11) whereby the members 94 may pivot about pins 100 in direction away from the arms 95 (FIG. 12).

The upper ends of the arms 95 carry the lower jaws 44 of the gripping members. The upper jaws 43 are preferably somewhat resilient, being of leaf spring material.

A spring 101 connecting between a projection 102 on each arm 95 and an ear 103 on the member 94 adjacent thereto and adjacent to their upper ends, yieldably holds each member 94 closely alongside the arm 95 adjacent thereto and also yieldably moves the jaws 43, 44 toward each other.

Each member 94 carries an electric solenoid coil 105, the armature 106 projecting therefrom to between a pair of corresponding opposed pair of projections 107 on each arm 95, and the ends of a pin 108 on the end of each armature 106 extends into arcuate slots 109 in said extensions. When the solenoid coils are energized, the jaws will be moved apart since each coil 105 and member 94 attached thereto will be moved upward, and when the coils are de-energized the members 94 will be moved downwardly under the influence of springs 101.

A roller 111 carried adjacent to the upper end of each arm 95 may engage the member 94 adjacent thereto for reducing the frictional resistance to movement of arms 95 and members 94 relative to each other as well as being a stop adapted to engage each ear 103 on each member 94.

The main drive shaft 53 carries a cam 112 (FIG. 1) that has a high side and a low side, and a cam follower 113 on a switch 114 is in engagement with said cam. This switch is in an electrical circuit with the solenoid coils 105, and the cam 112 and follower 113 are so arranged that when the coil is energized the jaws 44, 43 will move to spaced positions below and above the opposite ends of strip 6 (FIG. 8) and when the circuit is broken the springs 101 will close the jaws on the ends of said strip 6.

The shafts 98 to which arms 95 are connected are respectively provided with sprocket wheels 115, 116 (FIGS. 1–5). These sprocket wheels are omited from FIGS. 8, 11, 12 to prevent interference with the other structure shown in said views.

A sprocket chain 117 (FIG. 5) is connected at one of its ends with sprocket wheel 115 and extends partially around said wheel and then downwardly to below idler sprocket wheels 118 that are carried by arms 45 at their lower ends. The chain then extends upwardly and over sprocket wheel 116, and finally connects with the upper end of a helical spring 119. The other end of spring 119 is anchored to a collar on shaft 47 (FIG. 2).

Chain 117 insures simultaneous movement of the pairs of jaws 43, 44 toward and away from each other.

Connected with the shaft 98 that carries sprocket wheel 115, and offset to one side thereof, is a cam follower 121 (FIGS. 1 and 5). This follower rides on a rigid cam track 122 that extends slantingly downwardly in a direction forwardly of the forward side of the machine.

In operation, the motor 50 will continuously drive the outer clutch member of clutch 54 and upon lifting the trip arm 55 the clutch will be engaged with shaft 52 and will drive rollers 16, 22 which rollers will drive the band 8 and tapes 17 forwardly. As soon as the bar 81 stops the drive of rollers 16, 22, the hold-down bar 71 and cutting blade 28 will be caused to descend through their operative connections with cams 37, 65, and at substantially the same time the solenoid coils 105 will be energized to move the gripping jaws 43, 44 apart. The connection between the jaw supports and cams 122 will have caused the jaws 43, 44 at the opposite ends of the strip 6 to move over said ends as seen in FIG. 8, when the crank 90 has swung the arms 45 to their nearest position to the upper front side of the machine as seen in FIG. 7.

The solenoid coils 105 will then be de-energized to cause the jaws 43, 44 to grip the ends of the strip 6 under the influence of springs 107 (FIG. 11) at approximately the time said strip is cut from the band.

The hold-down 71 and knife 28 will then move to elevated positions and the band 8 will be driven forwardly for the next cutting operation while the arms 45 will swing outwardly of the machine. During this outward swinging the movement of cam follower 121 on track 122 and spring 119 will cause the pairs of jaws 43, 44 to move away from each other to thereby stretch the strip 6 that is held between the jaws of each pair (FIG. 11).

The operator, having a bundle of bananas 7 or other similar objects, will then quickly move them downwardly against the stretched strip 6 which will cause the arms 95 to swing to the position shown in FIG. 12 in which the jaws 43 will release the strip but not until jaws 44 have pressed the adhesive covered sides of tape sections 42 together thereby securing strip 6 around the bananas 7, and continued downward movement of the bananas will cause jaws 44 to rock on each other to the position in FIG. 12 to release the sections 42.

It will be noted that the yieldable jaws 43 have released the band as soon as the sections 42 are brought together, and members 94 will have pivoted away from the arms 95. Also stop members 126 respectively on the projections 97 (FIG. 12) have engaged the arms 45 so further downward swinging of arms 95 will be stopped.

The arcuate slots 109 in projections 107 permit the pin 108 on each solenoid armature to move relative to each arm 95 when each member 94 that carries the solenoid coil moves to the position shown in FIG. 12.

As soon as the sections 42 on strip 6 have been released, the arms 95 and member 94 will return to the position of FIG. 1 ready for another cycle as soon as the trip lever 55 is again actuated. It is obvious that the latter may be foot actuated, hand actuated, or may be automatically actuated.

One of the desirable features of the invention as above described is the fact that no glue or the like must be applied to the strip that encloses the bananas or other objects, since the use of glue not only creates complications, but is objectionable if it should be smeared on the fruit or vegetable products. Also, the tape sections that will project radially outwardly of the group of objects as seen in FIG. 12 provides means for stapling or otherwise securing a tag or advertisement thereto as may be desired in displaying the produce, although such staple or the like would not function to hold the sections together, hence the group of objects would be securely held together were tags or the like to be removed therefrom. In this connection it should be noted that the material of the strip, while adequate for holding the objects together, would be weakened were it torn by staples or the like while the tape section provides a strong tab. Therefore, one of the objects of the invention may comprise a package of the character shown in FIG. 12.

The drawings are intended to illustrate one embodiment of the invention, and it is obvious that different modifications may be made without departing from the spirit of the invention, and it is the intention that the claims appended hereto should cover such modifications.

I claim:

1. The method of securing a group of objects together with an elastic, stretchable strip of material that comprises the steps of; adherently securing a section of adhesive tape to each of the opposite ends of such strip with portions of said adhesive tape including the adhesive thereon projecting beyond the ends of said strip, then gripping the ends of said strip and stretching the latter horizontally and longitudinally thereof from its gripped ends, then moving said group of objects downwardly against the central portion of the strip so stretched and while maintaining said strip in its stretched condition swinging said ends thereof over the upper side of said objects and bringing the glued sides of the projecting portions of said sections of tape together into adherent holding relation and then releasing the said strips so the ends will be held together by said sections.

2. The method of securing a group of objects together with an elastic, stretchable strip of material that comprises the steps of; adherently securing a pair of adhesive tapes having an adhesive covering one of their sides to the opposite, longitudinally extending marginal portions of a band of said material leaving a substantial part of the widths of said tapes projecting outwardly of said band beyond said marginal portions, then cutting a strip off one end of said band transversely thereof including said tapes thereby providing sections of said tapes on the ends of said strip projecting therefrom, then stretching said strip around said group of objects and at the same time bringing the adhesive covered sides of the projecting portions of said sections together in adherent relation for holding said strip around said group of objects.

3. A machine for use in securing strips of an elastic, stretchable material about a group of objects comprising; a frame, a band of said elastic, stretchable material in a roll rotatably supported on said frame, a pair of rolls of adhesive tape rotatably supported on said frame, means for moving said band and said tapes from the rolls thereof along a path of travel in one direction and for adherently securing said tapes to one side of said band along the opposite marginal portions of the latter with said tapes projecting outwardly from said band along said portions, cutting means on said frame at a point along said path for successively cutting off the ends of said band and said tapes transversely of said band to form strips of said material having sections of said tape adherently secured to the opposite ends of each strip, gripping means for gripping the opposite ends of each strip so cut by said cutting means and means for moving said gripping means apart for stretching each such strip longitudinally thereof for presenting each strip in a position to be wrapped in a tensioned condition about each such group of objects.

4. A machine for use in securing strips of an elastic, stretchable material about a group of objects comprising; a frame, a band of said elastic, stretchable material in a roll rotatably supportd on said frame, a pair of rolls of adhesive tape rotatably supported on said frame, means for moving said band and said tapes from the rolls thereof along a path of travel in one direction and for adherently securing said tapes to one side of said band along the opposite marginal portions of the latter with said tapes projecting outwardly from said band along said portions, cutting means on said frame at a point along said path for successively cutting off the ends of said band and said tapes transversely of said band to form strips of said material having sections of said tape adherently secured to the opposite ends of each strip, gripping means for gripping the opposite ends of each strip so cut by said cutting means and means for moving said gripping means apart for stretching each such strip longitudinally thereof for presenting each strip in a position to be wrapped in a tensioned condition about each such group of objects, means actuable for movement under the force of such group of objects against the central portion of each strip while so gripped by said gripping means and while so tensioned for moving said strip about such group of objects and for bringing the projecting portions of the said sections of tape into adherent engagement with each other.

5. In combination with a strip of rubber-like, stretchable, elastic material having sections of adhesive tape adherently secured to one side thereof at its ends and projecting outwardly of said ends with adhesive exposed on the projecting portions of said sections; a frame, means on said frame for supporting said strip horizontally in a predetermined location, a pair of spaced gripping means on said frame at opposite ends of said strip supported for movement into gripping relation to said opposite ends, means mounting said gripping means for movement apart when in said gripping relation and for movement from said predetermined location to a position spaced from one side of said frame for holding said strip in a stretched horizontal position at said last mentioned position to enable a group of objects to be positioned on said strip and forceably moved downwardly to further stretch said strip, the space between said gripping means and below said strip being unobstructed for such downward movement of said objects and the portion of the strip between said gripping means, means mounting said gripping means for carrying said sections on said strips into adherent engagement between the exposed adhesive on the projecting portions of said sections upon said strip being forced downwardly by the downward movement of said objects for wrapping said strip about said objects and for securing said strip in object enclosing relation to said objects.

6. In combination with a strip of rubber-like, stretchable, elastic material having sections of adhesive tape adherently secured to one side thereof at its ends and projecting outwardly of said ends with adhesive exposed on the projecting portions of said sections; a frame, means on said frame for supporting said strip horizontally in a predetermined location, a pair of spaced gripping means on said frame at opposite ends of said strip supported for movement into gripping relation to said opposite ends, means mounting said gripping means for movement apart when in said gripping relation and for movement from said predetermined location to a position spaced from one side of said frame for holding said strip in a stretched horizontal position at said last mentioned position to enable a group of objects to be positioned on said strip and forceable moved downwardly to further stretch said strip, the space between said gripping means and below said strip being unobstructed for such downward movement of said objects and the portion of the strip between said gripping means, means mounting said gripping means for carrying said sections on said strips into adherent engagement between the exposed adhesive on the projecting portions of said sections upon said strip being forced downwardly by the downward movement of said objects for wrapping said strip about said objects and for securing said strip in object enclosed relation to said objects, means automatically actuated for releasing said gripping means from said gripping relation with said ends of said strip upon movement of the projecting portions of said sections into adherent relation.

7. In combination with a strip of rubber-like, stretchable, elastic material having sections of adhesive tape adherently secured to one side thereof at its ends and projecting outwardly of said ends with adhesive exposed on the projecting portions of said sections; a frame, means on said frame for supporting said strip horizontally in a predetermined location, a pair of spaced gripping means on said frame at opposite ends of said strip supported for movement into gripping relation to said opposite ends, means mounting said gripping means for movement apart when in said gripping relation and for movement from said predetermined location to a position spaced from one side of said frame for holding said strip in a stretched horizontal position at said last mentioned position to enable a group of objects to be positioned on said strip and forceably moved downwardly to further stretch said strip, the space between said gripping means and below said strip being unobstructed for such downward movement of said objects and the portion of the strip between said gripping means, means mounting said gripping means for carrying said sections on said strips into adherent engagement between the exposed adhesive on the projecting portions of said sections upon said strip being forced downwardly by the downward movement of said objects for wrapping said strip about said objects and for securing said strip in object enclosing relation to said objects, said gripping means being free from engagement with the exposed adhesive on said sections at all times during stretching and wrapping of said strip around said objects.

References Cited in the file of this patent

UNITED STATES PATENTS

| | | |
|---|---|---|
| 2,144,263 | Lane | Jan. 17, 1939 |
| 2,292,024 | Dreher | Aug. 4, 1942 |
| 2,516,292 | Bennett | July 25, 1950 |
| 2,741,885 | Allison | Apr. 17, 1956 |
| 2,764,160 | Alexander | Sept. 25, 1956 |
| 2,882,660 | Denton | Apr. 21, 1959 |